Dec. 17, 1963     O. B. SHERMAN     3,114,594
METHOD OF FORMING HOLLOW PLASTIC ARTICLES
Original Filed Sept. 21, 1953     3 Sheets-Sheet 1

INVENTOR.
ORVILLE B. SHERMAN
BY
W. A. Schaich and Leonard D. Soubier
ATTYS.

Dec. 17, 1963  O. B. SHERMAN  3,114,594
METHOD OF FORMING HOLLOW PLASTIC ARTICLES
Original Filed Sept. 21, 1953  3 Sheets-Sheet 2
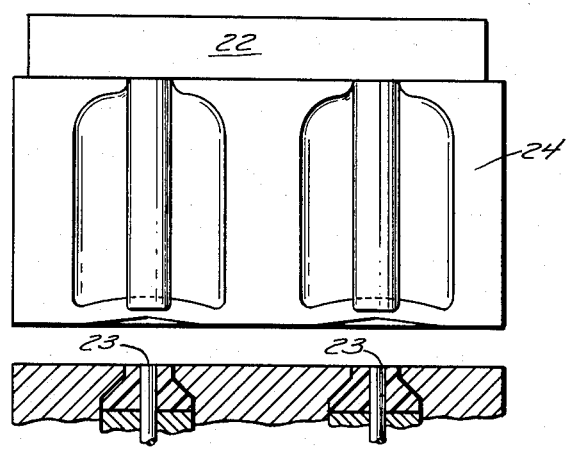
FIG. 6
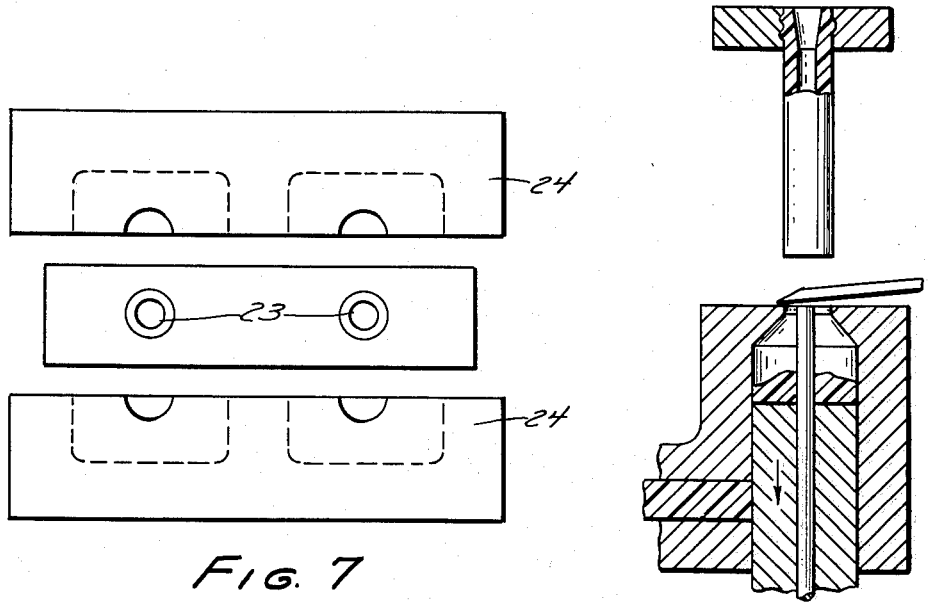
FIG. 7
FIG. 8
INVENTOR.
ORVILLE B. SHERMAN
BY
W. A. Schaich and Leonard D. Soubier
ATTYS.

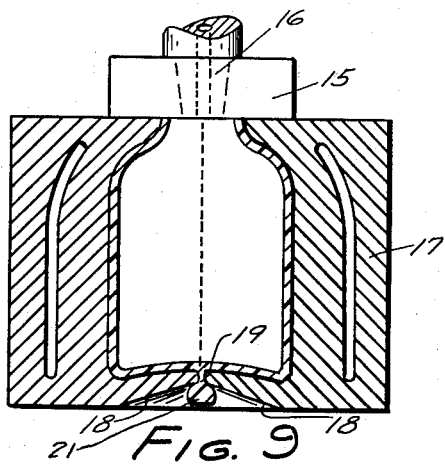
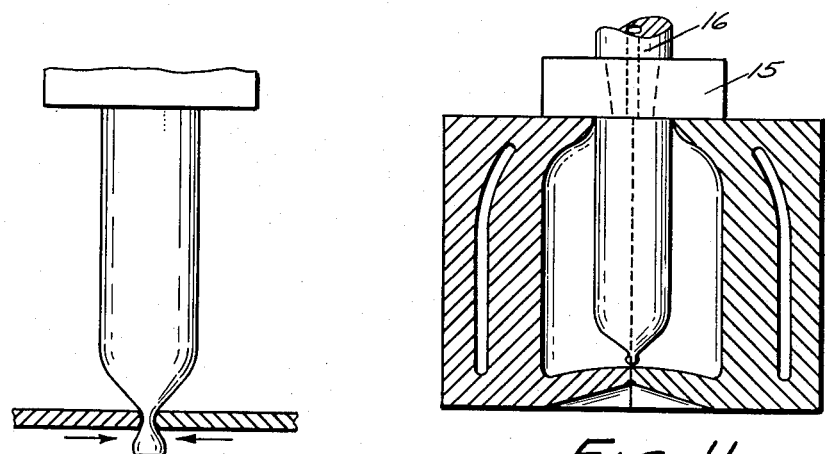

United States Patent Office 3,114,594
Patented Dec. 17, 1963

3,114,594
METHOD OF FORMING HOLLOW PLASTIC
ARTICLES
Orville B. Sherman, West Orange, N.J., assignor to Owens-
Illinois Glass Company, a corporation of Ohio
Continuation of application Ser. No. 381,257, Sept. 21,
1953. This application Oct. 6, 1959, Ser. No. 844,690
4 Claims. (Cl. 18—55)

This invention relates to the manufacture of hollow articles and more particularly to the manufacture of hollow articles having a neck opening and made of organic plastic material.

This application is a continuation of my copending application, S.N. 381,257, filed September 21, 1953, and assigned to the assignee of the present invention, now abandoned.

It is an object of this invention to provide a method of forming hollow plastic articles wherein a minimum of trimming or other operations is required after forming. Other objects of the invention will appear hereinafter.

Basically the method comprises extruding a quantity of plastic material from a parent mass into a tubular cavity, one end of the cavity being open, separating the quantity of plastic in the cavity from the parent mass, applying force to the mass of plastic in the cavity to force a portion of the plastic out of the open end of the cavity into a neck mold positioned over the cavity, continuing the application of force to said tubular mass simultaneously with the axial movement of the neck mold away from the open end of the cavity thereby removing a portion of the mass of plastic in the cavity, with the neck formed integral therewith, from the cavity, severing said removed portion from the remainder of the plastic in the cavity, and expanding the plastic to the walls of the mold by applying fluid under pressure.

Referring to the accompanying drawings:

FIGURE 6 is a part sectional elevational view of an apparatus for performing a modification of the method;

FIGURE 7 is a plan view of the same;

FIGURE 8 is a sectional elevational view of a part of the apparatus showing the steps in a further modification of the method;

FIGURE 9 is a sectional elevation of one form of mold; and

FIGURES 10 and 11 are sectional elevational views showing a further modification of the method.

Figure 1:
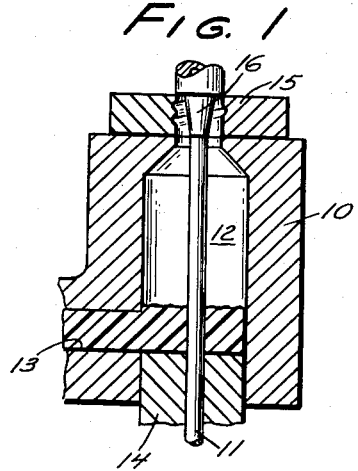
FIGURES 1 to 5 are sectional elevational views of an apparatus for performing the steps of the method.
Figure 2:
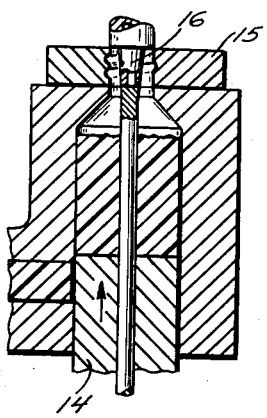
Figure 3:
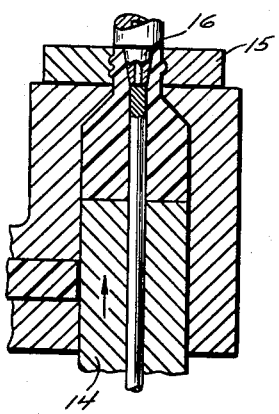
Figure 4:
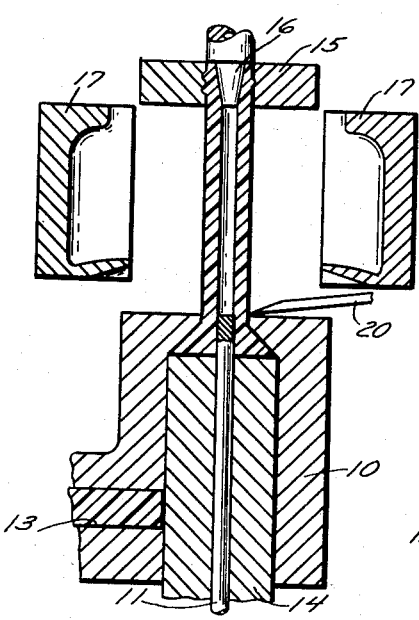

Referring to FIGURES 1 to 6, the apparatus for performing the method includes a body 10 having a vertical opening therethrough and a mandrel 11 positioned in the opening to form a tubular cavity 12, the upper end of the cavity being inwardly tapered toward the mandrel. The tubular cavity 12 is in communication with the outlet of a plasticizer and extruder (not shown) through communicating channel 13. A sleeve 14 surrounds the mandrel 11 and reciprocates vertically in the cavity 12 from a position below the communicating channel 13 to a position below the open end of the tubular cavity 12.

A partible neck mold 15 and hollow core 16 are mounted for relative axial movement into and out of alinement with the tubular cavity 12. A partible mold 17 is provided in which a tubular mass of plastic is expanded, as presently described. The bottoms of the mold sections are beveled at 18 (FIGURE 9) and slightly spaced apart at 19, when the mold is closed, in order to seal the plastic tubing.

At the beginning of the preferred method, the sleeve 14 is in its lowermost position and plastic material supplied by the extruder is allowed to enter through communicating channel 13 to a definite predetermined height in the tubular cavity. The sleeve 14 is then moved upwardly severing a quantity of plastic in the tubular cavity from the parent mass in the communicating channel. Continued movement of the sleeve forces a quantity of plastic material in the tubular cavity upwardly into the neck mold 15, which is in contact with the body 10, the core 16 being in contact with the mandrel 11. The neck mold and sleeve are then relatively moved upwardly thereby removing a portion of the tubular shaped mass of plastic, with the integral neck, from the cavity.

Figure 5:
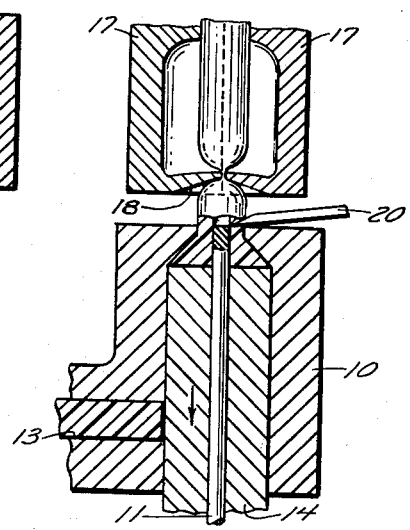

The sections of the mold 17 are then closed about the length of tubing, with the integral neck portion, pinching the length of tubing between the bottom of the mold sections, as shown in FIGURE 5. The shear blade 20 is then moved across the top end of the cavity severing the tubing from the remainder of the plastic in the cavity. Fluid is applied through the hollow core 16 to expand the tubing to the walls of the mold, as shown in FIGURE 9. After removal from the mold, the only trimming that is required is the removal of the small nubbin 21 of plastic which was pinched between the ends of the mold.

In describing this preferred form of the method, the apparatus has been shown as extruding the plastic material upwardly, but such is not required and the plastic material may be extruded in any direction, and the neck mold moved axially thereto, since the material is always under positive control. For example, the extruder might be positioned to extrude at any inclined angle, horizontally or even downwardly.

A modification of the method may be performed, as shown in FIGURE 8, by severing the length of tubing with the integral neck from the plastic material in the tubular cavity before closing the mold sections about the tubing.

A further modification may be performed by severing the length of tubing and pinching the end of the tubing to seal it before closing the sections of the mold. For example, the tubing may be pinched as shown in FIGURE 10 or otherwise marvered to seal the end. The sections of the mold are then closed about the tubing and the tubing is expanded to the walls of the mold by applying fluid under pressure through the core 16 (FIGURE 11). In this latter modification, the article is completed and no trimming is required after removal from the mold. Obviously, the bottom sections of the mold need not be spaced apart as in the other modification of the method.

A further modification of the method may be performed as shown in FIGURES 6 and 7 where a multiplicity of neck portions are simultaneously formed into a series of neck molds 22 by extruder orifices 23 and a length of tubing simultaneously extruded integral with each neck portion. The lengths of tubing may be severed before or after closing mold sections of a multiple cavity mold 24, as in the previous modifications of the method, and the lengths of tubing finally simultaneously expanded to final shape by applying fluid under pressure through the neck portion of each respective length of tubing.

The invention has been described as being applied to thermoplastic materials. The term "thermoplastic" as used herein defines any organic material which has the required condition of plasticity to permit expansion and setting in predetermined form.

The terms tubular and tubing, as used herein, are intended to include any hollow shapes in which plastic materials may be formed including non-circular and irregular shapes.

Modifications may be resorted to within the spirit and scope of the appended claims.

The embodiments of the invention in which an exclu-

I claim:

1. The method of forming a hollow article of plastic material which comprises first forming an annular neck for the article by injection molding of the material in an annular neck mold having a central air passage, extruding from an annular nozzle a tubular portion of the material integral with the neck of said article, the interior of the tube communicating with the neck mold air passage, closing the extruded tubing in spaced relation to the neck mold by pinching the tubing between portions of a sectional blow mold when the mold sections are closed, thereby disengaging said extruded tubing from the material in said nozzle, and thereafter blowing and thereby expanding the tubing for the first time into shaping contact with the closed mold by introducing blowing air through said neck mold air passage into the tubular extrusion.

2. The method of forming a hollow article from thermoplastic material which comprises injection molding a hollow neck portion of the article in a neck mold into which the plastic material is injected upwardly from an annular nozzle, relatively drawing the neck mold and molded neck upwardly away from the nozzle while extruding from the nozzle a tubular plastic extrusion integral with the molded neck, closing a separable blow mold in the tubular extrusion to pinch the tube shut at a point adjacent the nozzle thereby separating the tubular extrusion from the plastic in the nozzle, and thereafter blow molding the closed tubular extrusion for the first time interiorly of said blow mold into a body portion integral with the injection molded neck.

3. In a method of making a hollow plastic article having an injected molded portion and a blow molded portion, the steps of positioning an injection mold at an orifice, filling the injection mold with plastic material, thereby forming the injection molded portion of the article, moving the filled injection mold from the orifice while extruding through the orifice a tube joined at one end to material in the injection mold and joined at the other end to material in the orifice, closing the sections of a sectional blow mold on that portion of the tube intermediate the injection mold and the orifice, thereby pinching the tube shut and isolating the interior of the tube from the orifice while maintaining communication between the tube interior and the injection mold, and blowing the tube interiorly of the blow mold by introducing fluid under pressure through the injection mold into the tube interior, thereby forming the blow-molded portion of the article.

4. In a method of making a plastic container having integral neck and body portions, the steps of injection molding a container neck from plastic material issued from an orifice, concurrently linearly moving the injection molded neck from the orifice and extruding a hollow tube of plastic material from the orifice, halting the neck in spaced relation to the orifice, pinching the tube shut adjacent the orifice, and finally introducing air under pressure through the injection molded neck to blow the tube to the configuration of the container body.

References Cited in the file of this patent

UNITED STATES PATENTS

| | | |
|---|---|---|
| 2,080,783 | Petersen | May 18, 1937 |
| 2,331,702 | Kopitke | Oct. 12, 1943 |
| 2,562,523 | Brunet | July 31, 1951 |
| 2,597,558 | Bailey | May 20, 1952 |
| 2,810,934 | Bailey | Oct. 29, 1957 |

FOREIGN PATENTS

| | | |
|---|---|---|
| 688,997 | Great Britain | Mar. 18, 1953 |
| 1,029,586 | France | June 3, 1953 |